(No Model.)
E. KOLB.
CORN PLANTER AND FERTILIZER DISTRIBUTER.
No. 294,636. Patented Mar. 4, 1884.
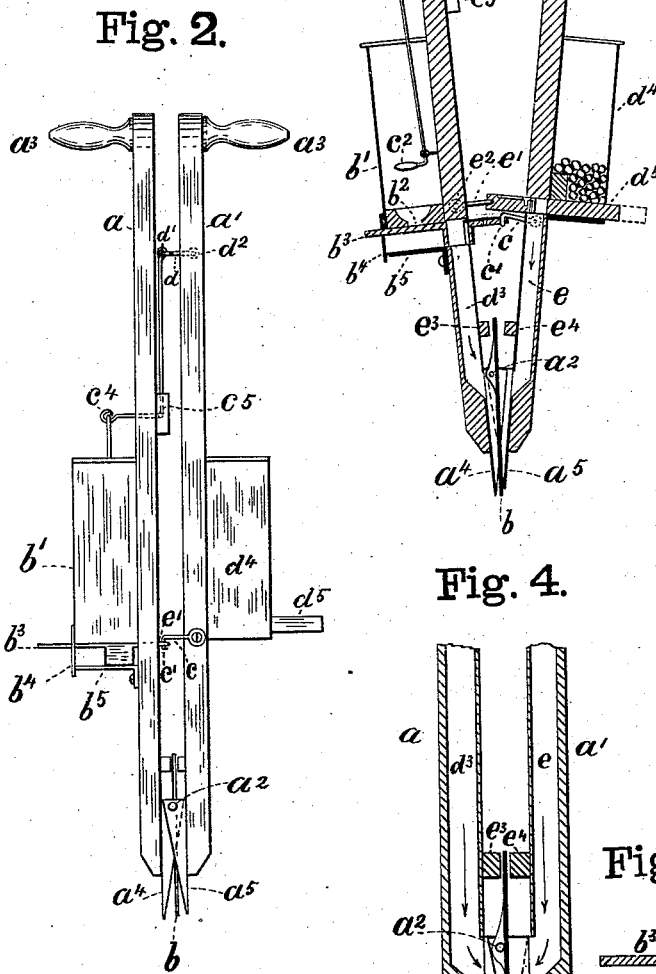
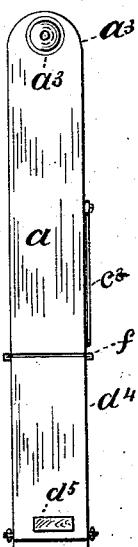
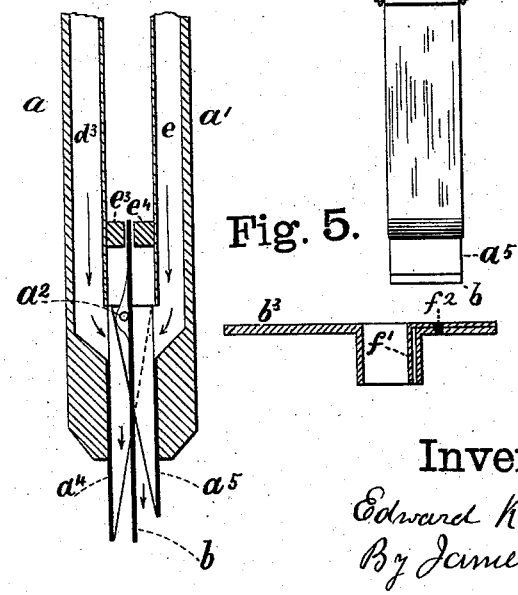
Witnesses.
J. M. Caldwell.
James Sangster
Inventor.
Edward Kolb.
By James Sangster
Atty.

UNITED STATES PATENT OFFICE.

EDWARD KOLB, OF LOCKPORT, NEW YORK.

CORN-PLANTER AND FERTILIZER-DISTRIBUTER.

SPECIFICATION forming part of Letters Patent No. 294,636, dated March 4, 1884.

Application filed October 3, 1883. (No model.)

*To all whom it may concern:*

Be it known that I, EDWARD KOLB, a citizen of the United States, residing in Lockport, in the county of Niagara and State of New York, have invented certain new and useful Improvements in Corn-Planter and Fertilizer-Distributer, of which the following is a specification.

The object of this invention is to provide a suitable means for dropping the corn or seed and fertilizing material by means of a convenient hand machine, all of which will be fully and clearly hereinafter shown by reference to the accompanying drawings, in which—

Figure 1 is a vertical section, showing the device in position for dropping the seed and fertilizing material to the lower part of the machine. Fig. 2 is a side elevation, showing the parts in position for depositing the seed and fertilizing material into the ground. Fig. 3 is a front elevation. Fig. 4 is an enlarged vertical section through the lower portion of the device, showing the passages open for the seed and fertilizing material on a larger scale; and Fig. 5 is a longitudinal vertical section through the fertilizing valve or box.

The two sides of the machine, consisting of the two bars, $a$ $a'$, are usually made of wood, and are jointed together by a joint-bolt, $a^2$. Each side is provided with a handle, $a^3$.

$a^4$ $a^5$ are the usual metal points. $b$ is a metal plate arranged between them. The metal points $a^4$ $a^5$ are securely fastened to the parts $a$ $a'$ by the ordinary screws or bolts. The part $b$ and the side bars and points are secured together, as before mentioned, by the bolt $a^2$.

$b'$ represents the receptacle for the fertilizing material. It is provided with a flaring opening, $b^2$, at the bottom, and with a sliding valve, $b^3$, arranged in slideways $b^4$ and $b^5$.

Jointed to the part $a'$ is a connecting-link, $c$, which connects with the box or valve $b^3$ at $c'$.

Within the fertilizer-receptacle is a stirrer or mixing device, $c^2$, having a vertical movement up and down within it, produced by means of a connecting-arm, $c^3$, connected to it by a joint, $c^4$. It is jointed to the side $a$ by a joint, $c^5$, and its upper end is jointed to a connecting-link, $d$, by a joint, $d'$, the link $d$ being jointed to the side $a'$ by a pin or bolt, $d^2$. The object of the stirring device is to keep the fertilizing material mixed up, so as to insure its filling the mold every time it is in position to be filled. The side $a$ is provided with a passage, $d^3$, for the fertilizing material to pass down and out into the ground in the direction of the arrows. The receptacle for the corn or seed $d^4$ is attached to the side $a'$, and is provided with a box or valve, $d^5$, through which the seed drops when in position over the passage $e$. To the inner end of the valve is jointed a connecting-link, $e'$, which link is jointed by a pin or bolt, $e^2$, (shown in dotted lines,) to the side $a$.

$e^3$ $e^4$ are two lugs, which keep the plate $b$ central or in position between the two points. The machine being provided with fertilizing material and seed or corn, it is held in the hands by the handles $a^3$, each being drawn apart, as shown in Fig. 1, which operation closes the points at the bottom. The implement is now forced down into the ground a sufficient distance and then brought into the position shown in Fig. 1, thereby allowing the seed to drop into the opening made for it, and also the fertilizing material, after which the instrument is withdrawn and the operation repeated. It will be seen that as the sides $a$ $a'$ are drawn apart the mixing device will be drawn upward, and both valves will be moved in position, so that the fertilizing material and the seed will drop down through the passages $d^3$ $e$, and is kept there until the implement is closed into the position shown in Fig. 2, and when closed as shown in Fig. 2 the action of all the parts is reversed, and the valves are in position to take the fertilizing material and seed from the receptacles. It will be noticed that the middle plate, $b$, makes a division, so as to continue the passages $d^3$ and $e$ to the bottom of the points. The plates $a^4$ and $b$ are also made longer than the plate $a^5$, thereby increasing the length of the passage $d^3$, say, from one-quarter to one-half inch, which arrangement allows the fertilizing material to drop that much lower than the corn or seed, so that the fertilizing material is in the best position to do the most good—a little below the corn or seed planted. The box $b^3$ is arranged below the receptacle $b'$ for the purpose of preventing clogging.

I claim as my invention—

In a corn-planting and fertilizing machine, the parts $a\ a'$, provided with the usual handles, seed-planting and fertilizing receptacle, their operating mechanism, and lugs $a^3\ a^4$, in combination with the pivoted central plate, $b$, and plates $a^4\ a^5$, substantially as and for the purposes specified.

EDWARD KOLB.

Witnesses:
J. M. CALDWELL,
JAMES SANGSTER.